United States Patent [19]

Snietka

[11] Patent Number: 5,157,762
[45] Date of Patent: Oct. 20, 1992

[54] METHOD AND APPARATUS FOR PROVIDING A THREE STATE DATA BASE FOR USE WITH AUTOMATIC OPTICAL INSPECTION SYSTEMS

[75] Inventor: Scott P. Snietka, Plantsville, Conn.

[73] Assignee: Gerber Systems Corporation, South Windsor, Conn.

[21] Appl. No.: 508,093

[22] Filed: Apr. 10, 1990

[51] Int. Cl.⁵ .............................................. G06F 15/40
[52] U.S. Cl. .................................. 395/129; 395/118; 382/16; 382/18
[58] Field of Search ................... 364/518, 521, 522; 340/747, 750; 395/129, 130; 382/16, 17, 18, 19

[56] References Cited

U.S. PATENT DOCUMENTS

| | | | |
|---|---|---|---|
| 4,500,202 | 2/1985 | Smyth | 356/237 |
| 4,578,810 | 3/1986 | MacFarlane et al. | 382/8 |
| 4,668,982 | 5/1987 | Tinnerino | 358/101 |
| 4,720,803 | 1/1988 | Ishii | 364/521 |
| 4,776,022 | 10/1988 | Fox et al. | 382/8 |
| 4,776,023 | 10/1988 | Hamada et al. | 382/8 |
| 4,830,497 | 5/1989 | Iwata et al. | 356/394 |

OTHER PUBLICATIONS

Model 076 Decompression Processor Specification Laser Plotter Brochure—GSI May 1985.
Model 588 AT&T Tape Format Specification Laser Plotter Brochure GSI May 1985.

*Primary Examiner*—Gary V. Harkcom
*Assistant Examiner*—Phu R. Nguyen
*Attorney, Agent, or Firm*—McCormick, Paulding & Huber

[57] ABSTRACT

A method and apparatus used with a printed circuit board (PCB) defect detecting system generates a reference database image of the PCB having tolerances for each individual PCB feature. A transitional data base is included that has three states, black, white and gray corresponding to areas where the PCB features respectively must appear, must not appear and may or may not appear.

4 Claims, 6 Drawing Sheets

METHOD AND APPARATUS FOR PROVIDING A THREE STATE DATA BASE FOR USE WITH AUTOMATIC OPTICAL INSPECTION SYSTEMS

TECHNICAL FIELD

This invention relates to defect detection systems used with the production of printed circuit hoards (PCB), and more particularly to a system which creates a transition data base (TDB) containing tolerance information of PCB patterns used in defect inspection of fabricated printed circuit boards.

BACKGROUND OF THE INVENTION

Printed circuit boards are today manufactured by a process Which is almost completely automated. The circuits for a particular printed circuit board are generated using a computer aided design (CAD) machine Which will not only generate a schematic of the printed circuit board but also will provide the board layout for all of the devices thereon. The printed circuit board layout information is provided to a device such as a laser plotter which exposes the artwork needed to fabricate the printed circuit board. The artwork comprises a series of transparent and opaque areas as features corresponding to the PCB devices.

However, defects may be present in the printed circuit board or the PCB artwork which would render the printed circuit board useless. It is therefore desirable to have a reference against which the artwork or the printed circuit board can be compared. These defects can have a variety of causes, including shrinkage in the artwork or failures in the fabrication process. Known systems for defect detection in printed circuit boards have often simply compared a given printed circuit board against a reference, defect free printed circuit board (i.e. golden board) to detect errors created during the fabrication process. However, this simple comparison will yield a large number of exceedingly minor defects which do not render the board unacceptable. Moreover, global changes to the features of the board caused by shrinkage of the artwork would result in all of the features being detected a defects in a system based upon a simple comparison to a golden board.

Some known optical PCB inspection systems are configured to examine inspection marks which are placed on the artwork away from the features. The dimensions of the registration marks on the printed circuit board are compared against a reference to determine the extent of shrinkage. Should the shrinkage exceed a certain magnitude, the board is considered to be defective.

The information corresponding to the features for the printed circuit board is digitized and stored on a magnetic medium, such as a magnetic tape. However, the sheer size of a resulting raster (X,Y) data file or data base requires that the data be compressed to reduce the storage volume and increase the speed of processing. A variety of compressed data base formats are found in the art, including run length encoded (RLE) format and scan line update (SLU), a format used by such companies as the American Telephone and Telegraph Company (AT&T).

In order to create an image of the PCB features, the data file must he decompressed into raster format and provided to a laser direct imager (LDI) such as the LDI 1500 marketed by the Gerber Scientific Instrument Company, the assignee of the present invention. The comparison of devices on the printed circuit board and features on the reference image is performed by a device such as the model 1850 defect detection system also marketed by the Gerber Scientific Instrument Company.

It would be advantageous to have a method and apparatus for creating a data base from compressed raster data for use in defect detection of printed circuit boards which would provide tolerances for individual printed circuit board features. The present invention is directed towards such a method and apparatus.

SUMMARY OF INVENTION

An object of the present invention is to provide a method and apparatus for use with printed circuit board automatic optical inspection systems which generates a data base having tolerances for individual printed circuit board features.

Another object of the present invention is to provide for a method and apparatus for the foregoing type which is characterized by a three state data base.

According to the present invention, an apparatus for generating a database of signals indicative of an image of printed circuit boards (PCB) features used in artwork in the fabrication of PCBs, the image comprised of an array of pixels having either a first state (black) or a second state (white) arranged in a sequence of scan lines with the black state pixels corresponding to the PCB features, each of the scan lines comprised of at least one run of pixels of the same state. The apparatus comprises a first mechanism for receiving signals corresponding to a current and a previous scan line; a second mechanism for identifying a run boundary formed by a pixel at the end of a first run and a pixel at the beginning of a second run on the current scan line and a third mechanism for determining the state of the runs. The apparatus also includes a fourth mechanism for determining the state of a run in the previous scan line in registration with the current scan line run boundary; a fifth mechanism for changing to a third state (gray) the state of a preselected tolerance number of pixels about the boundary in the first and second runs. A sixth mechanism changes to the third state pixels in the adjacent scan lines in registration with the one of the first or second runs comprised of first state pixels should the previous scan line run in registration with one of the run boundary pixels be in a different state therefrom. The sixth mechanism also changes to the third state pixels including a preselected tolerance number of pixels in registration with the current scan line boundary.

DESCRIPTION OF THE PREFERRED EMBODIMENT

Figure 1:
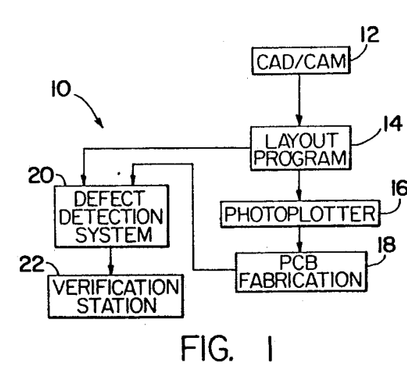
FIG. 1 is a simplified schematic drawing illustrating several devices used in the fabrication of a printed circuit board.

Referring now to FIG. 1 there is shown in simplified schematic form a series of devices representative of a system 10 used in the fabrication of a printed circuit board. Typically, the circuits to be fabricated on the printed circuit board are generated using a CAD/CAM apparatus (block 12) which generates a data file containing a schematic of the circuits. At Block 14 this data file is input to a program to generate the physical layout for the printed circuit board. The volume of data is substantial, as each point or pixel on the printed circuit board must be described by two spatial coordinates (X,Y) and one coordinate indicative of the state of that pixel, either black or white. The size of the corresponding data file is quite large, so most systems will use one of several known techniques to compress the data. These techniques include a variety of run length encoded formats or a scan line update (SLU) format such as the AT&T format referenced above. This data file is then provided to a series of devices, including a photoplotter 16 used to fabricate the artwork necessary to make the printed circuit board. The photoplotter is typically a laser direct imager (LDI). The LDI moves the exposing laser beam scanning spot with respect to a write platen and modulates the beam off and on as commanded by the input data. After the line is drawn, the platen is moved one mil and the next line is drawn. The process continues until the entire image is exposed on to the film. For a full sized PCB image there will be 24,200 scans each consisting of 17,800 bits, 2225 bytes or 1112.5, 16 bit words. Lastly, at block 18 the printed circuit board is fabricated using known equipment.

In order to test the printed circuit board for defects, the compressed data file is also provided to an overall printed circuit board defect detection system 20, such as the model 1850 defect detection system referenced above. As detailed hereinafter, the model 1850 will decompress the data back to raster format to generate a perfect defect free reference image of the printed circuit board. This image can then be used to compare against a scanned image of the printed circuit board to locate defects which can be subsequently be verified at verification station 22.

Figure 2:
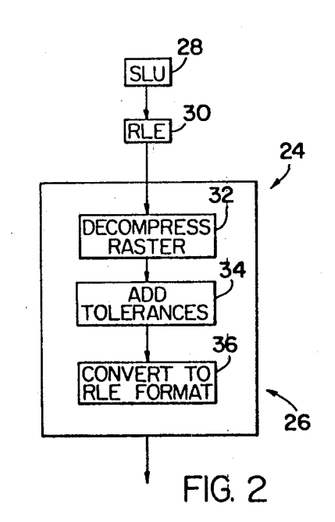
FIG. 2 is a simplified schematic illustration of a printed circuit board defect detection system including an apparatus provided by the present invention.

FIG. 2 is a diagrammatic illustration of the operation of a portion of a defect detection system 24 provided according to the present invention used to locate errors in printed circuit board or PCB artwork. The system 24 includes a data tolerating apparatus 26 which generates a transition data base (TDB) having three state (black, white, gray) RLE data from two state (black, white) RLE data in a manner detailed hereinafter. Although the present invention preferably converts two state RLE data into three state RLE data, those skilled in the art will note that two state data in raster format can also he processed into a three state raster database with appropriate changes in software.

Compressed data corresponding to the features on a printed circuit board are provided from a CAD system in the SLU format of run length encoded data (block 28). The data is then translated into a 16 bit RLE format (block 30), preferably the Gerber Scientific Instrument 16 bit format characteristic of the model 1850 defect detection system. The data is decompressed into a raster form (block 32). Most computers lack the capacity to hold a large raster image in main memory. For example, an 18"×24" PCB image at 5 mil resolution requires more than 200MB of memory. Consequently, the system converts the RLE image to a hybrid raster format in blocks of scan lines in a manner detailed hereinafter. Each block of scan lines is now described by a list of runs and a block of raster data.

The data tolerating apparatus receives at block 34 the hybrid format RLE data and modifies the data in a manner detailed hereinafter to provide each printed circuit hoard feature with dimensional tolerances of a preset value. The feature tolerances are represented by the third, gray state. The tolerance data is then recompressed in a known manner to RLE format for use by the system 20 in detecting PCB defects (block 36).

As noted above, the data generated by the CAD system is written in compressed form on industry compatible nine track phase encoded magnetic tape at a density of 1600 bytes per inch. The data bytes are organized on tape in a standard IBM format such that the most significant byte appears first. A complete magnetic tape contains one or more image data sets with the appropriate labels at hardware tape marks. The tape labels use a variation of the ANSI tape label standard as detailed in the IBM publication "OS/VS Tape Labels". document number GC26-3795. Each record of the label is an 80 byte physical record written in 7 bit ASCII code. The first four bytes of each record make up the identifier of a particular label record tape. There may exist any of five tape label record types, VOL. 1 (the volume header label), HDR 1, (file header label record number 1), HDR 2 (file header record number 2), EOF 1 (file trailer label record number 1) and EOF 2 (file trailer label record number 2).

The data sets are blocked into 4096 byte long physical records. Each physical record is filled completely without regard to the logical record boundaries. Logical records may therefore overlap physical record boundaries and ignore any hardware considerations introduced by record gaps. Two consecutive hardware marks follow the last EOF2 label on the tape and denote the logical end of the tape.

Figure 3:
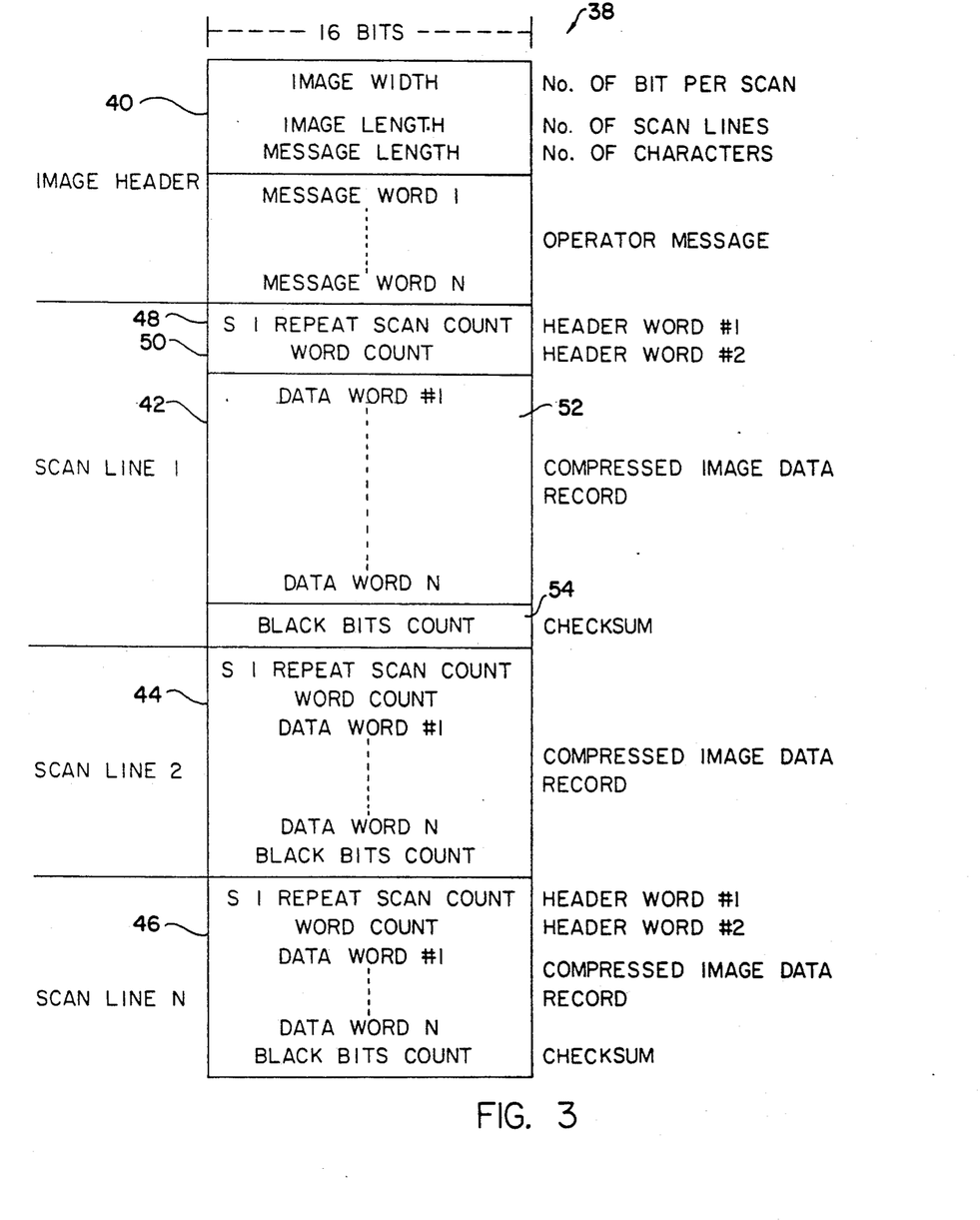
FIG. 3 is a simplified diagrammatic illustration of the logical record format for compressed data records used in the system of FIG. 2.

FIG. 3 is a schematic illustration of the logical record format of the tape described above. The tape 38 comprises several sections, including image header 40, scan line 1 (42), scan line 2 (44), and scan line N (46). The image header contains information regarding the number of bytes per scan, the number of scan lines, the number of characters in an optional operator message, and the operator message. The first word 48 corresponding to scan line 1 is indicative of the number of repeat scans for that particular scan line. The second header word 50 details a number of runs per line. As is known, a run is a number of contiguous characters (pixels) of the same state in a scan line. The compressed image data record 52 follows, as does a check sum trailer 54. The same word configuration is used in the remaining scan lines. The first header word defines the initial color state of the scan line (black/white), the end of the image indicator and repetition count for the scan data. For example, bit 14=1 denotes the last scan line record of the current image. Vertical compression is accomplished by compressing duplicate scan lines. Bits 0 to 13 contain a count of the number of times the scan line data in this record is to be imaged; where a 1 means a single copy of the scan line is to be produced. Typically, the second header word is used for error checking and contains a count of the number of compressed data words in the scan line record. The data base is compressed by counting consecutive color bits within each scan line. The compressed data words are essentially a series of on/off counts. Each 16 bit data word is interpreted as one of two possible modes. The first mode, mode 0 is optional in sparse image areas. The second mode, mode 1, is more efficient when the image area becomes dense or complex. Bit 15 indicates the mode for each data word. It is 0 for mode 0 and 1 for mode 1. Since a 15 bit count exceeds the maximum scan width of 17,800 bits, a monotone scan line can be compressed into one data word. Therefore, additional data words are only necessary when there is a change of color or state. In mode 0 there is one data word for each change.

The initial color state is given on the scan line header. In mode 1, two 7 bit counters (bits 8 to 14) and (bits 0 to 6) represent opposite color states. Mode 1 is used only when there exists a pair of consecutive counts greater than 0 but less than 128. Bits 8 through 14 represent the first count which is always the opposite color state from the preceding data word. Bits 0 through 6 represent a second count and is always the opposite color (state) from counter 1. Bit 7 is a color synchronization bit to be used for error checking purposes. It should reflect the color that counter 2 produces. Bit 7 dose not control the color state of counter 2, but is used in confirming that the laser imaging hardware is synchronized with the data. For example, if the preceding data word was mode 1 and through some data transmission error bit 15 was dropped to erroneously indicate mode 0, there would have been one rather than two color transitions causing the color state to lose synchronization. This would be detected when the color state of the hardware did not match bits 7 of the next mode 1 data word. An error message results when the data base is imaged. There is also a "slowness factor" which is transferred to the decompressor processor of the system 24 which indicates the number of times each scan line is to be repeated on output. This parameter is also inserted in an output data base to the laser direct imaging (LDI) optical system following the preamble in its idle pattern.

The compression format detailed with respect to the preferred embodiment is based on a group of codes which are used to indicate differences and similarities between scan lines. Each code word is 16 bits long and is formatted with the most significant 4 bits containing the code number. The least significant 12 bits contain information relating to the code. Depending on the code there may be additional words following the code word.

Of the 16 available code numbers 11 are currently defined.

| Code Number | Description |
|---|---|
| 1 | Binary scan line |
| 2 | Repeat previous scan line |
| 3 | Scan line |
| 4 | Full scan line |
| 5 | Clear byte string |
| 6 | Set byte string |
| 7 | End of updates |
| 8 | Message/comments |
| 11 | End of image |
| 13 | Set axis |
| 14 | Set y |

Codes 1 through 7 are actually used to express the PCB feature images. In addition, Codes 8, 11, 13 and 14 are used to define the image size and make any necessary comments. Full size images are expressed only using these codes. A more detailed description of the group of words associated with each code can be found in the Gerber Scientific Instrument document entitled "Model 588 AT&T Tape Format Specification for the LDI 1500 Laser Plotter".

Two codes in the AT&T SLU tape format change individual bits in the previous scan line to generate the next scan line. The "5" code clears the hit starting at the given address. The "6" code sets these bits. These codes can he implemented in two ways. The first assumes that only the changed bits are coded. The "1" bits are set to 0 and "0" bits are set to 1. This essentially is an inversion process so only one code is needed, not two. The other method of implementing these codes can be looked on as a run length encoding bit strings with changes. If a change in state occurs at one end of a bit string, the entire length of the string is coded. This change can result in use of one code instead of two for better compression if there are changes at both ends of a string.

Figure 4:
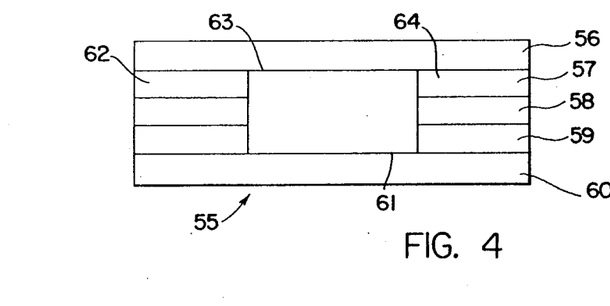
FIG. 4 is a simplified illustration of a sequence of scan lines having PCB element features represented as runs of pixels of like color.

Referring now to FIG. 4 there is shown a top view of a portion of a PCB artwork feature 55 representing a device on a printed circuit board. Scan lines 56, 57, 58, 59 and 60 are to be written on the PCB artwork. Each scan line is comprised of a linear array of pixels. Scan line 56 is outside of feature 61 and therefore has all "clear" pixels in the Figure or "white" pixels in the data base image. Scan lines 57-59 include the PCB feature and each has a run of white pixels 62 followed by a run of "black" pixels 63 followed by a run of white pixels 64. Scan line 60 is comprised of all white pixels as it is outside of the PCB feature center 61 60. Scan lines 56 and 60 can be thought to be comprised of only one run of white while scan lines 57-59 can be thought of as comprising three runs each; one white followed by one black followed by one white.

As noted above, the present invention provides for a transitional data base wherein PCB artwork features in a reference data base are modified to include dimensional tolerances therefor. For the system 24, a global inner/outer feature tolerance is predefined in magnitude. The three state, run length encoded image data produced as output by system 24 are characterized by on/off/don't care pixels, or black/white/gray representations used for illustrative purposes.

Figure 5:
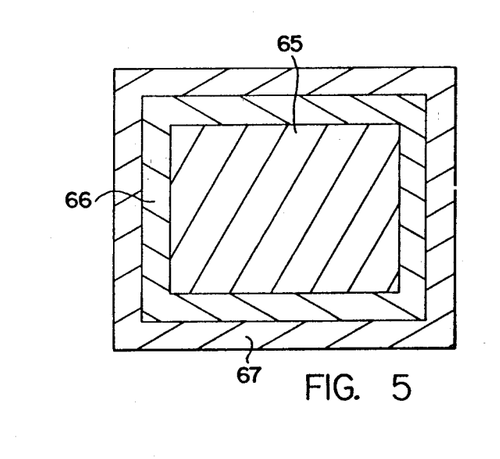
FIG. 5 is an illustration of an image of a PCB feature provided by the present invention characterized by inner and outer tolerances.

FIG. 5 contains the PCB feature found in FIG. 4 after processing by the present invention. Black pixels represent image areas where the pattern must appear, white pixels represent image areas where the pattern must not appear. Gray pixels represent an image area where an appearance or lack of appearance of the pattern (black pixel) is unimportant. These "gray" pixels occur on pattern edges and represent inner/outer tolerances or acceptable pattern variances. In FIG. 5, region 65 corresponds to that portion of the feature which must appear. Region 66 is a nominal area of that feature while region 67 represents the largest area of which that feature may have.

Figure 6:
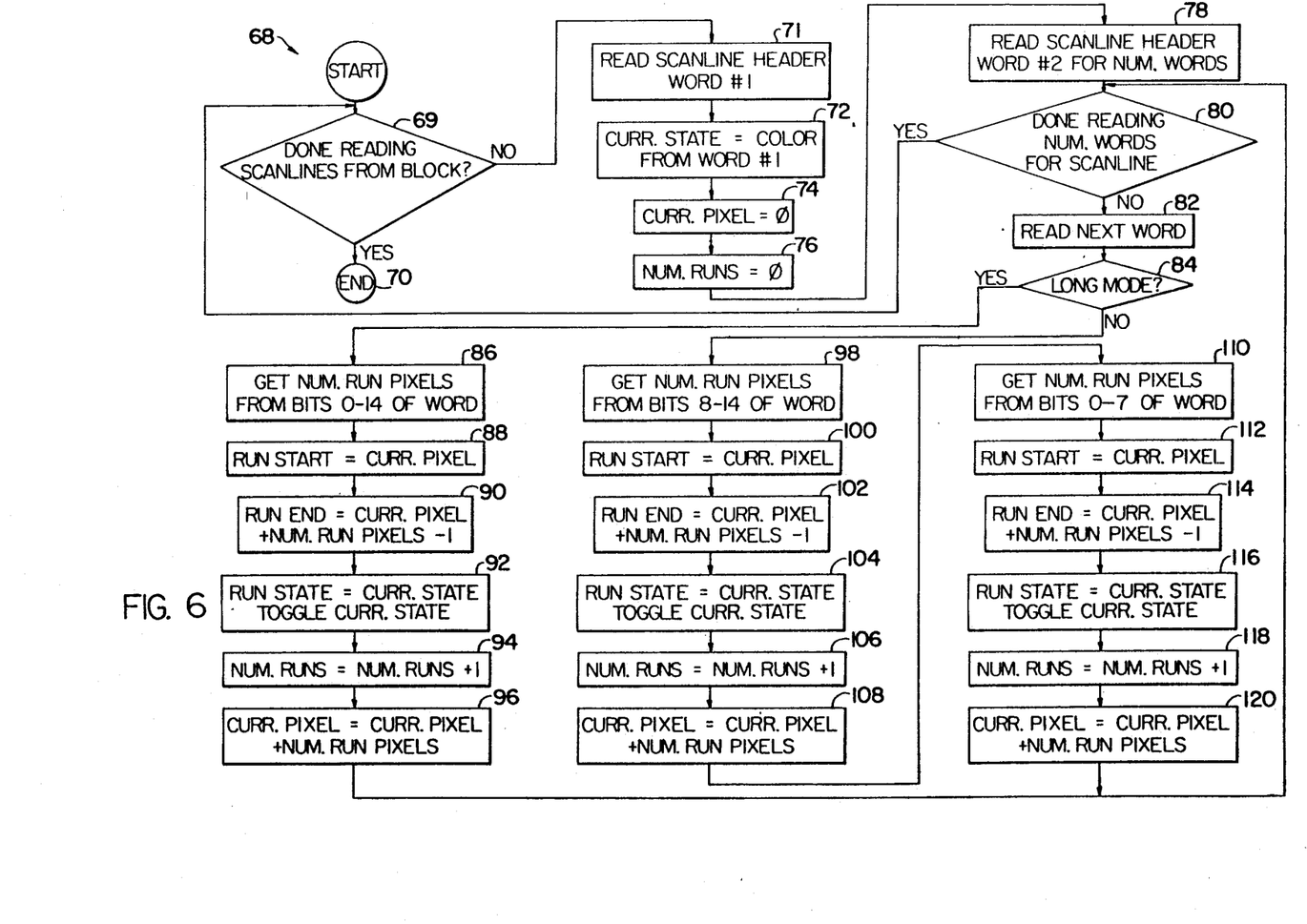
FIG. 6 is a diagrammatic illustration of an algorithm used by the apparatus of FIG. 2 to receive compressed scan line data signals and convert those signals to a hybrid raster format.
Figure 7:
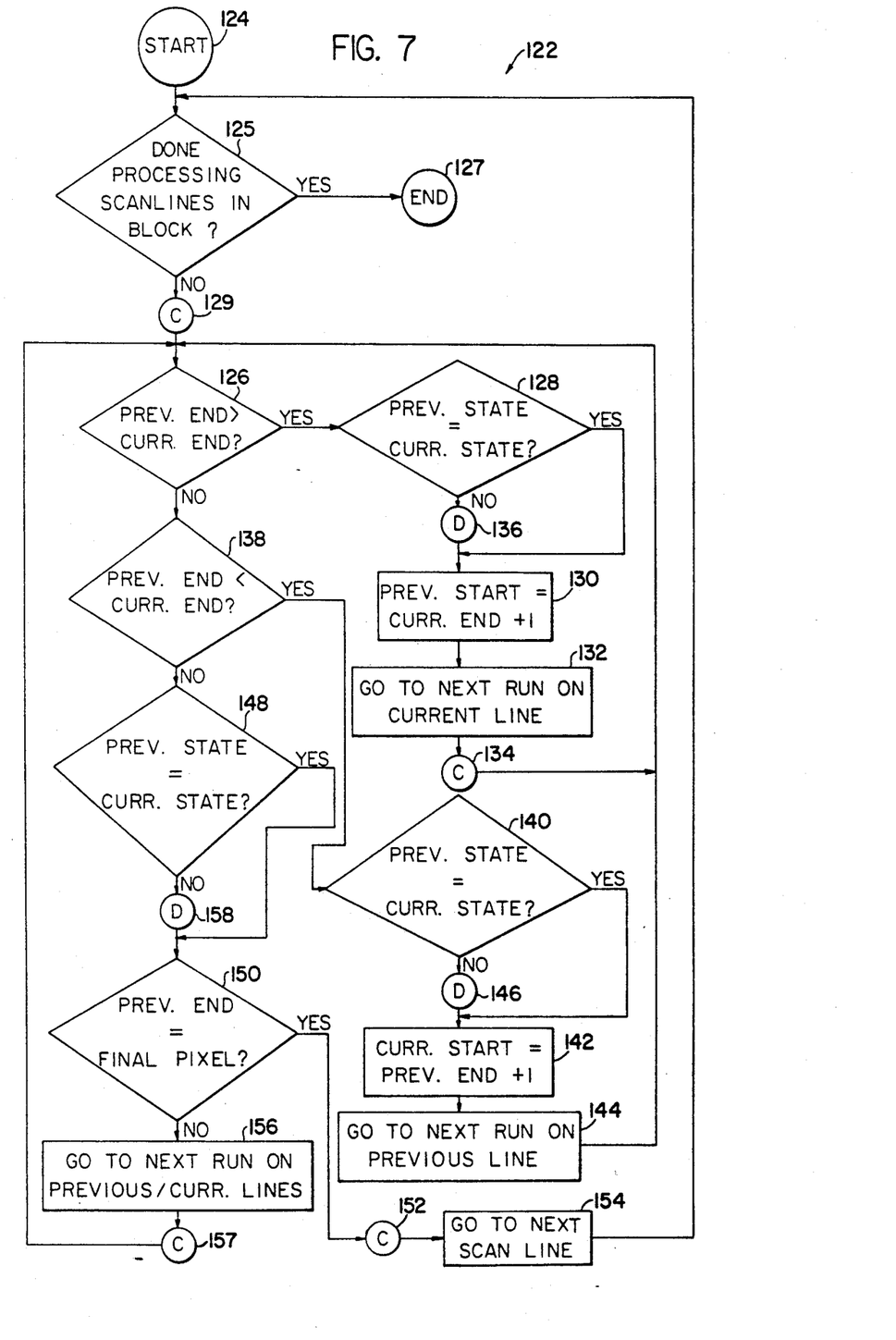
FIG. 7 is a diagrammatic illustration of an algorithm used by the apparatus of FIG. 2 to generate a three-state raster image having tolerances of individual PCB features.

As stated above, the image is processed in scan line blocks, FIGS. 6 and 7 represent the processing of a block. Those skilled in the art will note that special attention must be paid to the borders between blocks, and that these border conditions are handled in a known manner.

FIG. 6 is a diagrammatic illustration of an algorithm 68 used by the system 24 in generating the hybrid raster data base. A glossary of abbreviations used in FIGS. 6–9 are listed below.

| | | |
|---|---|---|
| prev-end | = | end pixel # of run on previous line |
| curr-end | = | end pixel # of run on current line |
| prev-start | = | start pixel # of run on previous line |
| curr-start | = | start pixel # of run on current line |
| prev-state | = | state of run on previous line |
| curr-state | = | state of run on current line |
| final-pixel | = | final pixel in scan line |
| num-runs | = | # of runs on scan line |
| curr-pixel | = | current pixel # on scan line |
| curr-state | = | current state (black or white) |
| run-start | = | start pixel # for current run |
| run-end | = | end pixel # for current run |
| run-state | = | state for current run |

The algorithm 68 outlines the conversion of the RLE format data file into lists of raster format runs for each scan line. Each run has a start pixel number an end pixel number and a state or color. At block 69 the algorithm determines whether all of the scan lines for that block have been input. If all lines have been input, the system exits the algorithm at block 70. If not, the scan line header word number 1 is read at block 71. The current pixel state is determined from word number 1 at block 72. The current pixel is set to 0 at block 74 and the number of runs is set to 0 at block 76. The scan line header for word number 2 is read to determine the number of words describing runs on the scan line (block 78).

At block 80, the algorithm 68 determines whether a number of words for the scan line have all been read. If yes, then the program returns to block 69. If not, the next word is read (block 82). It is determined at block 84 whether the word is in the long mode. If yes, the number of pixels in the control run is determined from the 0 to 14 bit of the first word (block 86). At block 88 the start pixel for the current run is set to the current pixel on the scan line. At block 90 the end pixel number for the current run is set equal to the current pixel number plus the number of pixels in the run minus 1. At block 92 the state for the current run is set equal to the current state, either black or white. Next at block 94, the algorithm sets the number of runs on the scan line equal to the number of runs plus and, at block 96 the current pixel number on the scan line is set equal to the current pixel number plus the number of pixels for the current run.

If, at block 80, the word is not in long mode, the algorithm 68 will enter at block 98, obtain the number of pixels in the current run from bits 8 to 14 of the word and set the start pixel number for the current run equal to the current pixel number on that scan line (block 100). The algorithm will set the end pixel number for the current run equal to the current pixel number plus the number of pixels in the run minus 1 (block 102). Next at block 104, the state for the current run is set equal to the opposite of the current state, that is the program "toggles" the state. The number of runs on the scan line is then set equal to the number of runs on the scan line plus 1 (block 106) and the current pixel number on the scan line is set equal to the current pixel number plus the number of pixels for the current run (block 108).

The algorithm 68 continues at block 110 and obtains the number of pixels for the current run from bits 0 to 7 of the word and, at block 112, sets the start pixel number for the current run equal to the current pixel number. The end pixel number for the current run is set equal to the current pixel number plus the number of pixels in the run minus 1 (block 114). The algorithm toggles the current state by setting the state for the current run equal to the opposite of the current state (block 116). The algorithm then sets the number of runs on the scan line equal to the number of runs plus 1 (block 118). and sets the current pixel number on the scan line equal to the current pixel number plus the number of pixels for the current run (block 120).

Those skilled in the art will note that the algorithm 68 as set forth in FIG. 6 omits some processing that goes on simultaneously in the system 24. As well as filling in the list of runs for a scan line, the algorithm also fills in the raster list for the scan line indicating the state for each pixel. As noted above, the image processing is accomplished by the algorithm 68 in blocks of scan lines. Scan line header word number 1 specifies the number of times the scan line is to be repeated. Consequently, if the scan line has to be repeated 5 times the run list and raster list are copied 5 times. After filling in the run list and raster list for each scan line in the block, the lists are used as input to another algorithm detailed hereinafter.

Referring now to FIG. 7 there is shown an algorithm 122 used by the system 24 in generating a three state raster image in accordance with the present invention. In brief, the algorithm 122 indexes along two scan lines, the current scan line and the previous line, comparing the state of vertically adjacent runs when a state transition is detected in the current scan line. A state transition in the current scan line is indicative of either the beginning or the end of a feature in the horizontal direction. A state transition between runs in adjacent scan lines is indicative of either the beginning or end of a feature in the vertical direction. The algorithm changes pixel states for a selected number of pixels adjacent the feature beginning and end in the current scan line. With the adjacent vertical run comparison, the algorithm will also change the color or state of pixels along multiple scan lines both inside and outside the original feature as shown in FIG. 4.

As noted above, the hybrid raster image is comprised of a sequence of scan lines formed from a corresponding sequence of scan line data in RLE format. In the preferred embodiment, the algorithm 122 of FIG. 7 does not perform a pixel by pixel comparison between vertically adjacent scan lines and adjacent pixels on the current scan line. Rather, a comparison is made between the pixel location, or equivalently its number, on either the current or previous scan line which corresponds to an end of a "run" of the same state. This run comparision is significantly more efficient than a straight pixel comparison.

The algorithm 122 receives at block 124 signals corresponding to two adjacent scan lines. These scan lines have been generated in accordance with the algorithm outlined with respect to FIG. 6. Note that for the first scan line in an image, the algorithm will as part of the initialization process provide a "line 0" of all white pixels for the first line to be compared with. At block 125 the algorithm determines whether it is done processing scan lines in the block. If yes, then the algorithm ends at block 27. If no, then the algorithm exits to the algorithm detailed hereinafter with respect to FIG. 8. At block 126 the algorithm compares the end pixel number of the run on the previous line with the end pixel number of the run on the current line.

If the end pixel number of the run on the previous line is greater than the end pixel number of the run on the current line, the algorithm checks the state of adjacent runs on the current and the previous scan lines (block 128). If they are the same, the algorithm advances to block 130 and sets the start pixel number of the run on the previous line equal to the end pixel number of the run on the current line plus 1. At block 132 the algorithm advances to the next run on the current line and subsequently advances to another algorithm detailed hereinafter with respect to FIG. 8 (block 134). Should a negative decision have been reached earlier at block 128, the algorithm exits to an algorithm detailed hereinafter with respect to FIG. 9 (block 136).

If the end pixel number of the run on the previous line is less than the end pixel number of the run on the current line as determined at block 138, the algorithm will check the state of the run on the previous line as compared with the state of the run on the current line (block 140). If states are equal, the algorithm will, at block 142, set the start pixel number of the run on the current line equal to the end pixel number of the run on the previous line plus 1. At block 144 the algorithm advances to the next run on the previous line. If however a negative decision is reached at block 140, the algorithm will advance to an algorithm detailed hereinafter with respect to FIG. 9 (block 146).

If at block 138 a negative decision has been reached, the algorithm will at block 148 determine whether the state of the run on the previous line is equal to the state of the run on the current line. If yes, then the algorithm will, at block 150 determine if the end pixel of the run on the previous line corresponds to the final pixel of the scan line. If yes, the algorithm executes the algorithm detailed hereinafter with respect to FIG. 8 (block 152) and advances to the next scan line (block 154). If the end of the scan line has not been reached, the algorithm will, at block 156, go to the next run on the previous and current scan lines and advance to the algorithm detailed hereinafter with respect to FIG. 8 (block 157). If at block 148, the state of the run on the previous line is not equal to the state of the current run, the algorithm exits to the algorithm detailed hereinafter with respect to FIG. 8 (block 158).

Figure 8:
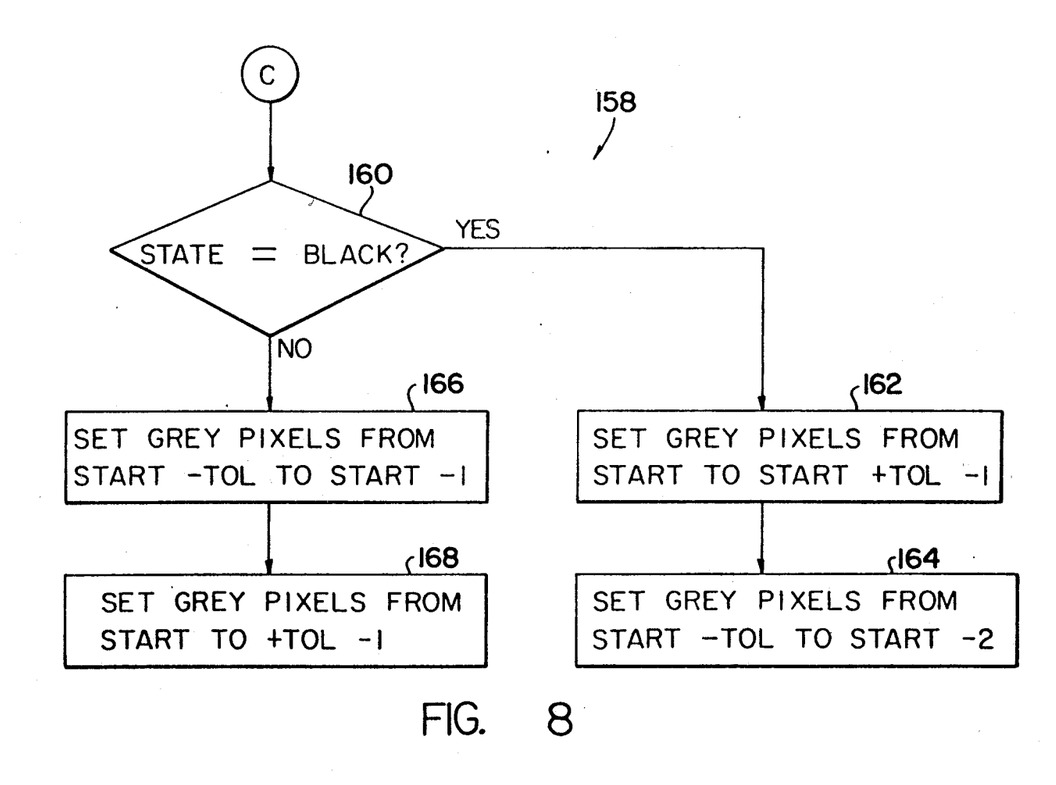
FIG. 8 is a diagrammatic illustration of an algorithm accessed by the algorithm of FIG. 7 in generating tolerances for PCB features across a current scan line.
Figure 9:
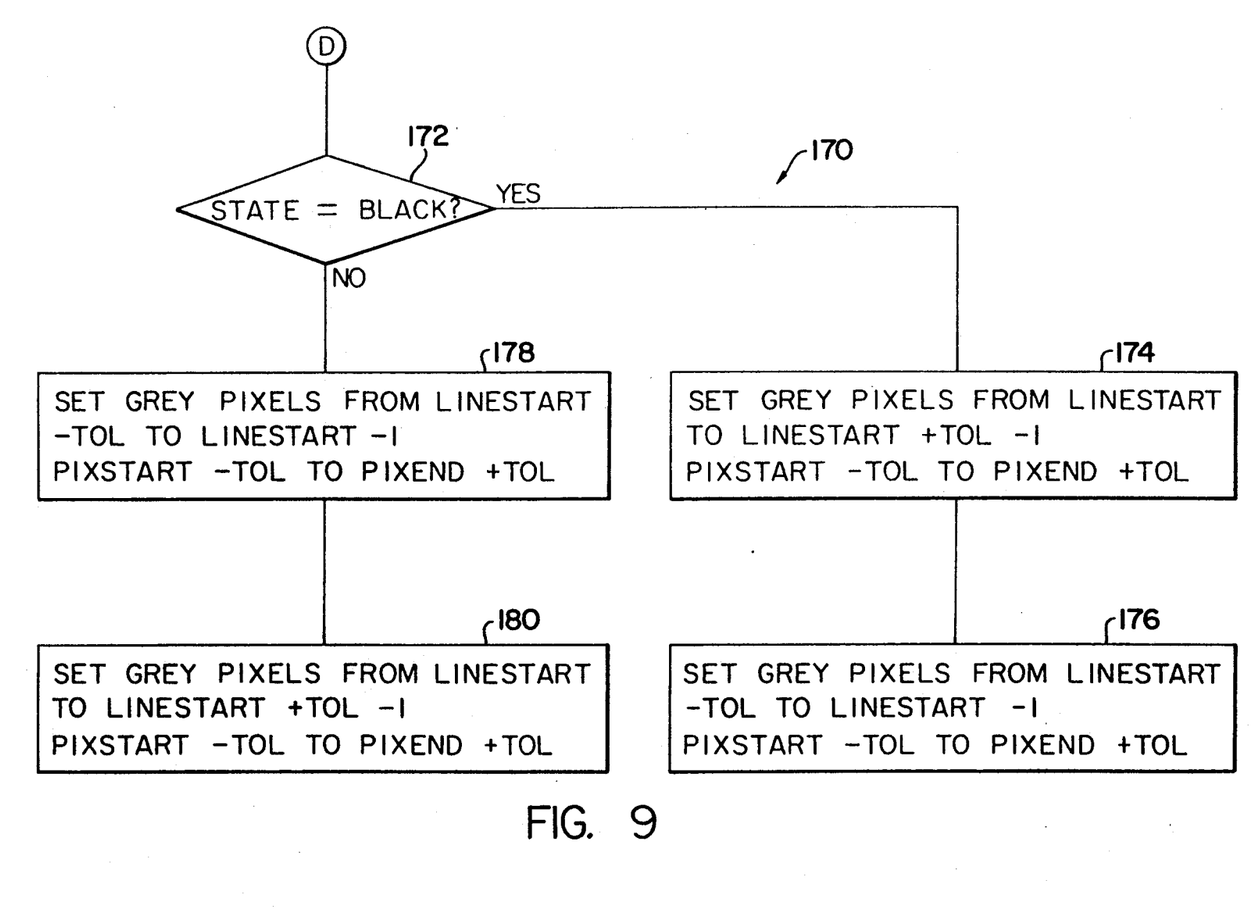
FIG. 9 is a diagrammatic illustration of an algorithm accessed by the algorithm of FIG. 7 in generating PCB feature tolerances in scan lines adjacent to a current scan line.

The present invention provides for both an inner and outer feature tolerance spaced about the nominal feature dimensions. The algorithms used by the preferred embodiment of the present invention and detailed with respect to FIGS. 8 and 9 are respectively used to provide those feature tolerances in the horizontal (across the scan line) and vertical (adjacent scan lines) directions. A preselected number of pixels is determined to be the feature tolerance. Referring now to FIG. 8 there is illustrated an algorithm 158 used by the system 24 provided in accordance with the present invention. The algorithm 158 is accessed in accordance with the decisions reached by the system in the algorithm 122 detailed hereinbefore with respect to FIG. 7.

At block 160 the state of the current run is determined. If the state is black, then the algorithm at block 162 sets to gray pixels from start plus a number 1 less than the number of pixels corresponding to the tolerance value previously selected. At block 164 the algorithm next sets to gray pixels from the start pixel number minus the tolerance value to the start pixel number minus 1. The steps executed at blocks 162 and 164 establish the inner and outer feature tolerances, respectively at the beginning of the feature.

However, if the run state has not been determined to be black, the algorithm will, at block 166 set to gray pixels from the pixel beginning at the start pixel number minus the tolerance value to the start pixel number minus 1. At block 168 the algorithm sets to gray pixels from the start pixel to the start pixel plus the tolerance value minus 1. Similarly, the steps executed by the algorithm at blocks 166 and 168 establish the inner and outer feature tolerances, respectively for the end of the feature.

FIG. 9 is a diagrammatic illustration of an algorithm 170 executed by the system 24 to establish feature tolerances in the vertical or adjacent scan line direction. As noted above, each scan line has as associated scan line number. The algorithm 170 is accessed in accordance with the decisions reached by the system in the algorithm 122 detailed hereinbefore with respect to FIG. 7. At block 172 the state of the run on the current scan line is determined. If the state is black, then the algorithm at block 174 sets to gray pixels from the start of present run minus the tolerance value to the end of the present run plus the tolerance value for the current scan line and for the scan lines whose scan line number is equal to the current scan line number plus the tolerance value minus 1. At block 176 the algorithm next sets to gray pixels from the start of the present run minus the tolerance value to the end of the present run plus the tolerance value for the scan line beginning at the current scan line minus the tolerance value to the current scan line number minus 1. The steps executed at blocks 174 and 176 establish the inner and outer vertical feature tolerances, respectively at the beginning of the feature.

However, if the run state has not been determined to be black, the algorithm will, at block 178 set to gray pixels from the start of the present run minus the tolerance value to the end of the present run plus the tolerance value for the current scan line minus the tolerance value to the current scan line minus 1. At block 180 the algorithm sets to gray pixels from the start of the present run minus the tolerance value to the end of the present run plus the tolerance value for the current scan line to the current scan line plus the tolerance value minus 1. Similarly, the steps executed by the algorithm at blocks 178 and 180 establish the inner and outer feature tolerances, respectively for the end of the feature. Those skilled in the art will note that the algorithm detailed hereinabove with respect to FIGS. 7 and 8 will ensure that the toleranced database will have encompassed the feature as shown in FIG. 4.

Similarly, although the invention has been shown and described with respect to a preferred embodiment thereof, it should be understood by those skilled in the art that various other changes, omissions and additions thereto may be made therein without departing from the spirit and scope of the present invention.

I claim:

1. An apparatus for generating a database of signals indicative of an image of printed circuit boards (PCB) features used in artwork in the fabrication of PCBs, said image comprised of an array of pixels having either a first state (black) or a second state (white) arranged in a sequence of scan lines with said black state pixels corresponding to said PCB features, each of said scan lines comprised of at least one run of pixels of the same state, said apparatus comprising;

a first means for receiving signals corresponding to a current and a previous scan line;

a second means for identifying a run boundary formed by a pixel at the end of a first run and a pixel at the beginning of a second run on said current scan line;

a third means for determining the state of said pixels in said runs, a fourth means for determining the state of pixel in said previous scan line in registration with said current scan line run boundary;

a fifth means for changing to a third state (grey) the state of a preselected tolerance number of pixels about said boundary in said first and second runs;

a sixth means for changing to said third state pixels in adjacent scan lines in registration with the one of said first or second runs comprised of first state pixels should said previous scan line pixel in registration with a one of said run boundary pixels be in a different state therefrom, said sixth means further for changing to said third state pixels including said preselected tolerance pixels in registration with said current scan line run boundary.

2. A method for generating a database of signals indicative of an image of printed circuit boards (PCB) features used in artwork in the fabrication of PCBs, said image comprised of an array of pixels having either a first state (black) or a second state (white) arranged in a sequence of scan lines with said black state lines comprised of at least one run of pixels of the same state, said method comprising the steps of:

receiving signals corresponding to a current and a previous scan line;

identifying a run boundary formed by a pixel at the end of a first run and a pixel at the beginning of a second run on said current scan line;

determining the state of said pixels in said runs, determining the state of a pixel in said previous scan line in registration with said current scan line run boundary;

changing to a third state (grey) the state of a preselected tolerance number of pixels about said boundary in said first and second runs;

changing to said third state pixels in said adjacent scan lines in registration with the one of said first or second runs comprises of first state pixels should said previous scan line pixel in registration with a one of said run boundary pixels be in a different state therefrom, further changing to said third state pixels including a preselected tolerance number of pixels in registration with said current scan line run boundary.

3. A system for generating a three state transition data base (TDB) for use in detecting defects in a printed circuit board (PCB) having circuit features thereon, said system comprising:

a means for receiving a database having signals corresponding to an image of said PCB, said database being in a run length encoded—raster hybrid format including a plurality of scan lines comprises of an array of pixels each pixel position having a number and each pixel being in either a first state (black) or a second state (white), said scan lines having a scan line number and at least one run of pixels of the same state; and a controller including:

a means for receiving signals corresponding to two adjacent scan lines, a previous scan line and a current scan line;

a means for comparing an end pixel number of a first run on the previous line with the end pixel number of a first run on the current line; if the end pixel number of the first run on the previous scan line is greater than the end pixel number of the first run on the current scan line;

a means for checking the pixel state of adjacent runs on the current and the previous scan lines, if said current and adjacent run pixel states are the same, setting a start pixel number of the run on the previous scan line equal to an end pixel number of the run on the current scan line plus 1.

a means for advancing to a second run on the current scan line and subsequently determining the pixel state of the current scan line second run.

a first state setting means for setting to a third state (gray) current scan line pixels from the current scan line second run start pixel number to the current scan line second run start pixel number plus 1 less a tolerance value if the pixel state is black;

a second state setting means for setting to the third state current scan line pixels from said current scan line second run start pixel number minus the tolerance value to the current scan line second run start pixel number minus 1;

a third state setting means for setting to the third state current scan line pixels from the current scan line second run start pixel number minus the tolerance value to the current scan line second run start pixel number minus 1 if the current scan line second run pixel state is white;

a fourth state setting means for setting to the third state current scan line pixels from the current scan line second run start pixel number to the current scan line second run start pixel number plus the tolerance value minus 1;

a means for determining the pixel state of the current run if the pixel state of adjacent runs on the current and the previous scan lines are not the same;

a fifth state setting means for setting to the third state current scan line pixels from the start of the current run minus the tolerance value to the end of the current run plus the tolerance value for the current scan line and for the scan lines having a scan line number equal to the current scan line number plus the tolerance value minus 1 if the pixel state is black;

a sixth state setting means for setting to the third state pixels from the start of current run minus the tolerance value to the end of the current run plus the tolerance value in scan lines whose pixel numbers begin at the current scan line number minus the tolerance value to the current scan line number minus 1;

a seventh state setting means for setting to the third state pixels from the start of current run minus the tolerance value to the end of the current run plus the tolerance value in scan lines whose numbers begin at the current scan line minus the tolerance value to the current scan line minus 1 if the current scan line run pixel state is white and if the current run pixel state has not been determined to be black;

an eighth state setting means for setting to the third state pixels from the start of current run minus the tolerance value to the end of the current run plus the tolerance value in scan lines whose pixel numbers begin at the current scan line to the current scan line plus the tolerance value minus 1;

a means for comparing the run pixel state on the previous scan line with the run pixel state on the current scan line if the end pixel number of the run on the previous scan line is less than the end pixel number of the run on the current scan line and, a means for setting the start pixel number of the run on the current line equal to the end pixel number of the run on the previous line plus 1 if said pixel states are the same;

a means for advancing to a second run on the previous scan line;

a means for determining the pixel state of the current run if said previous scan line and current scan line run pixel states are not the same, a ninth state setting means for setting to the third state pixels from the start of current scan line run minus the tolerance value to the end of the current run plus the tolerance value in scan lines whose pixel numbers begin at the current scan line and for scan lines having a scan line number equal to the current scan line number plus tolerance value minus 1 if the pixel state is black;

a tenth state setting means for setting to the third state pixels from the start of the current run minus the tolerance value to the end of the current run plus the tolerance value in scan lines whose numbers begin at the current scan line minus the tolerance value to the current scan line number minus 1;

an eleventh state setting means for setting to the third state pixels from the start of present run minus the tolerance value to the end of the present run plus the tolerance value in scan lines whose pixel numbers begin at the current scan line minus the tolerance value to the current scan line minus 1 if the current scan line pixel state is white;

a twelfth state setting means for setting to the third state pixels from the start of the current run minus the tolerance value to the end of the current run plus the tolerance value in scan lines whose pixel numbers begin at the current scan line to the current scan line plus the tolerance value minus 1;

a means for comparing the pixel state of the run on the previous scan line with the pixel state of the run on the current scan line, and if said states are the same, determining if the end pixel of the run on the previous line corresponds to the final pixel of the current scan line if the end pixel number of the run on the previous scan line is not less than the end pixel number of the run on the current scan line;

a means for determining the pixel state of the current run, if the state is black, setting to a third state (grey) pixels from start plus a number 1 less than a tolerance value if said current run end pixel is said final current scan line pixel;

a thirteenth state setting means for setting to a the third state pixels from the start pixel number minus the tolerance value to the start pixel number minus 1;

a fourteenth state setting means for setting to the third state pixels from the start pixel number minus the tolerance value to the start pixel number minus 1 if the current scan line run pixel state is white;

a fifteenth state setting means for setting to the third state pixels from the start pixel to the start pixel plus the tolerance value minus 1;

a means for advancing to a next scan line;

a means for determining the pixel state of the current run if the pixel state of the run on the previous line is not equal to the current run pixel state, a sixteenth state setting means for setting to the third state pixels from the start of the current run minus the tolerance value to the end of the current run plus the tolerance value in scan lines whose pixel numbers begin at the current scan line and for the scan lines having a scan line number equal to the current scan line number plus tolerance value minus 1 if the pixel state is black;

a seventeenth state setting means for setting to the third state pixels from the start of the current run minus the tolerance value to the end of the current run plus the tolerance value in scan lines whose pixel numbers begin at the scan line beginning at the current scan line minus the tolerance value to the current scan line number minus 1;

an eighteenth state setting means for setting to the third state pixels from the start of present run minus the tolerance value to the end of the present run plus the tolerance value in scan lines whose pixel numbers begin at the current scan line minus the tolerance value to the current scan line minus 1 if the current scan line run pixel state is white;

a nineteenth state setting means for setting to the third state pixels from the start of current run minus the tolerance value to the end of the current run plus the tolerance value in scan lines whose numbers begin at the current scan line to the current scan line plus the tolerance value minus 1;

a means for advancing to next runs on the previous and current scan lines if the previous line end pixel number does not equal said final scan line pixel number, a means for determining the pixel state of the current run, a twentieth state setting means for setting to a third state (grey) pixels from the current scan line run start pixel plus a number 1 less than a tolerance value if the pixel state is black;

a twenty first state setting means for setting to a the third state pixels from the current scan line run start pixel number minus the tolerance value to the current scan line run start pixel number minus 1;

a twenty second state setting means for setting to the third state pixels from the current scan line run start pixel number minus the tolerance value to the current scan line run start pixel number minus 1 if the current scan line run pixel state is white;

a twenty third state setting means for setting to the third state pixels from the current scan line run start pixel to the start pixel plus the tolerance value minus 1; and a means for receiving signals corresponding to a next adjacent scan line.

4. A method used with a system for detecting defects in a printed circuit board (PCB) having a circuit features thereon, said system receiving a database having signals corresponding to an image of said PCB, said database being in a run length encoded—raster hybrid format including a plurality of scan lines comprises of an array of pixels, each pixel position having a number and each being in either a first state (black) or a second state (white), said scan line having at least one run of pixels of the same state, said method comprising the steps of:

receiving signals corresponding to two adjacent scan lines, a previous scan line and a current scan line;

comparing an end pixel number of a first run on the previous line with the end pixel number of a first run on the current line; if the end pixel number of the first run on the previous scan line is greater than the end pixel number of the first run on the current scan line;

checking the state of pixels in said adjacent runs on the current and the previous scan lines, said current and adjacent run pixel states are the same, setting a start pixel number of the run on the previous scan line equal to an end pixel number of the run on the current scan line plus 1;

advancing to a second run on the current scan line and subsequently, determining the pixel state of the current scan line second run, if the pixel state is black, setting to a third state (grey) current scan line pixels from the current scan line second run start pixel number to the current scan line second run start pixel number plus 1 less a tolerance value;

setting to the third state current scan line pixels from said current scan line second run start pixel number minus the tolerance value to the current scan line second run start pixel number minus 1;

if the current scan line run pixel state is white, setting to the third state current scan line pixels from the start pixel number minus the tolerance value to the start pixel number minus 1:

setting to the third state current scan line pixels from the start pixel number to the start pixel number plus the tolerance value minus 1:

if the pixel state of adjacent runs on the current and the previous scan lines are not the same, determining the pixel state of the current run; if the pixel state is black, setting to the third state current scan line pixels from the start of the current run minus the tolerance value to the end of the current run plus the tolerance value for the current scan line and for the scan lines having a scan line number equal to the current scan line number plus the tolerance value minus 1;

setting to the third state pixels from the start of current run minus the tolerance value to the end of the current run plus the tolerance value in scan lines whose pixel numbers begin at the current scan line number minus the tolerance value to the current scan line number minus 1:

if the current scan line run pixel state is white, setting to the third state pixels from the start of current run minus the tolerance value to the end of the current run plus the tolerance value in scan lines whose pixel numbers begin at the current scan line minus the tolerance value to the current scan line minus 1 if the current run pixel state has not been determined to be black;

setting to the third state pixels from the start of current run minus the tolerance value to the end of the current run plus the tolerance value in scan lines whose pixel numbers begin at the current scan line to the current scan line plus the tolerance value minus 1;

if the end pixel number of the run on the previous scan line is less than the end pixel number of the run on the current scan line, comparing the run pixel state on the previous scan line with the run pixel state on the current scan line and, if said states are the same, setting the start pixel number of the run on the current line equal to the end pixel number of the run on the previous line plus 1;

advancing to a second run on the previous scan line;

if said previous scan line and current scan line run pixel states are not the same, determining the pixel state of the current run, if the pixel state is black, setting to the third state pixels from the start of the current run minus the tolerance value to the end of the current run plus the tolerance value in scan lines whose pixel numbers begin at the current scan line and for scan lines having a scan line number equal to the current scan line number plus tolerance value minus 1;

setting to the third state pixels from the start of the current run minus the tolerance value to the end of the current run plus the tolerance value in scan lines whose pixel numbers begin at the current scan line minus the tolerance value to the current scan line number minus 1;

if the current scan line run pixel state is white, setting to the third state pixels from the start of present run minus the tolerance value to the end of the present run plus the tolerance value in scan lines whose pixel numbers begin at the current scan line minus the tolerance value to the current scan line minus 1;

setting to the third state pixels from the start of the current run minus the tolerance value to the end of the current run plus the tolerance value in scan lines whose pixel numbers begin at the current scan line to the current scan line plus the tolerance value minus 1;

if the end pixel number of the run on the previous scan line is not less than the end pixel number of the run on the current scan line, comparing the pixel state of the run on the previous scan line with the pixel state of the run on the current scan line, and if said states are the same, determining if the end pixel of the run on the previous line corresponds to the final pixel of the current scan line; and, if said current run end pixel is said final current scan line pixel, determining the pixel state of the current run, if the state is black, setting to a third state (gray) pixels from start plus a number 1 less than a tolerance value;

setting to a the third state pixels from the start pixel number minus the tolerance value to the start pixel number minus 1;

if the current scan line run pixel state is white, setting to the third state pixels from the start pixel number minus the tolerance value to the start pixel number minus 1;

setting to the third state pixels from the start pixel to the start pixel plus the tolerance value minus 1;

advancing to a next scan line;
if the pixel state of the run on the previous line is not equal to the current run pixel state,
determining the pixel state of the current run, if the pixel state is black, setting to the third state pixels from the start of current run minus the tolerance value to the end of the current run plus the tolerance value in scan lines whose pixel numbers begin at the current scan line and for the scan lines having a scan line number equal to the current scan line number plus tolerance value minus 1;
setting to the third state pixels from the start of current run minus the tolerance value to the end of the current run plus the tolerance value in scan lines whose pixel numbers begin at the scan line beginning at the current scan line minus the tolerance value to the current scan line number minus 1;
if the current scan line run pixel state is white, setting to the third state pixels from the start of present run minus the tolerance value to the end of the present run plus the tolerance value in scan lines whose pixel numbers begin at the current scan line minus the tolerance value to the current scan line minus 1;
setting to the third state pixels from the start of current run minus the tolerance value to the end of the current run plus the tolerance value in scan lines whose pixel numbers begin at the current scan line to the current scan line plus the tolerance value minus 1;
if the previous line end pixel number does not equal said final scan line pixel number, advancing to next runs on the previous and current scan lines,
determining the pixel state of the current run, if the pixel state is black, setting to a third state (grey) pixels from the current scan line run start pixel plus a number 1 less than a tolerance value;
setting to a the third state pixels from the current scan line run start pixel number minus the tolerance value to the current scan line run start pixel number minus 1;
if the current scan line run pixel state is white, setting to the third state pixels from the current scan line run start pixel number minus the tolerance value to the current scan line run start pixel number minus 1;
setting to the third state pixels from the current scan line run start pixel to the start pixel plus the tolerance value minus 1; and
receiving signals corresponding to a next adjacent scan line.

* * * * *